2,924,218

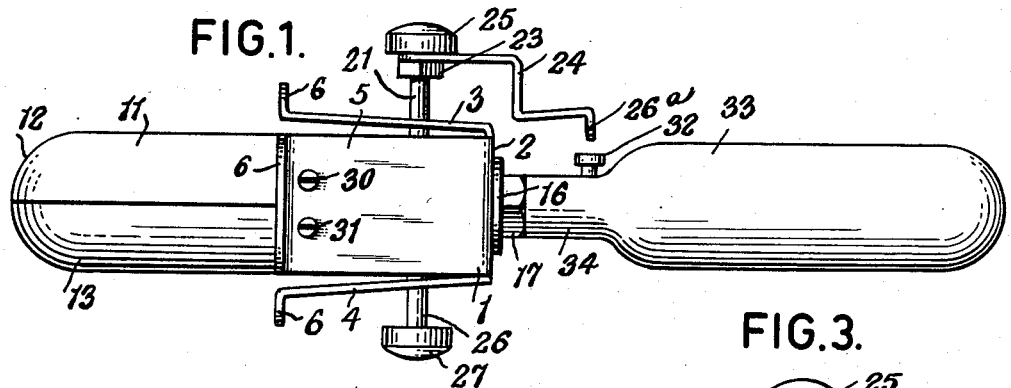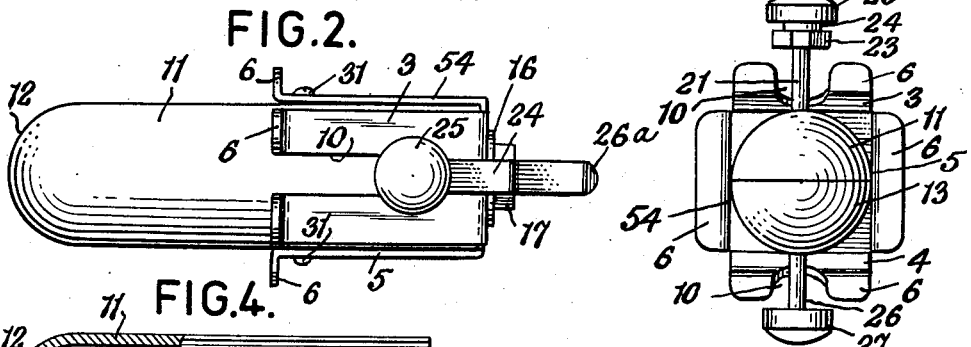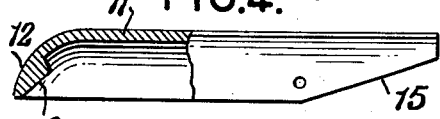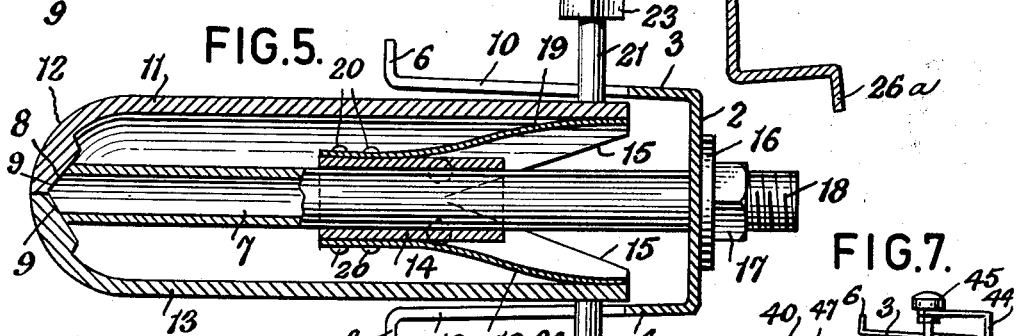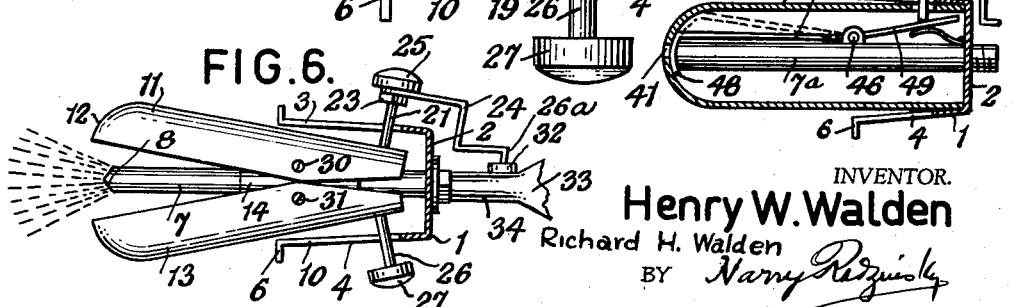
INVENTOR.
Henry W. Walden
Richard H. Walden

United States Patent Office 2,924,218
Patented Feb. 9, 1960

IRRIGATING OR SPRAYING DEVICES

Henry W. Walden, New York, and Richard H. Walden, Plandome, N.Y.; said Henry W. Walden assignor to said Richard H. Walden Application April 17, 1957, Serial No. 653,462

10 Claims. (Cl. 128—244)

This invention relates to an irrigation or spray device, such as is used for the injection and distribution of medicaments, antiseptics, cleansing preparations and other materials in liquid, spray, mist, foam or jelly or in other forms, into body cavities.

It is one of the objects of the invention to provide a device of this character by means of which the preparation to be injected will be forced into the body cavity by the use of gas or air under pressure, so that the preparation will reach all parts of the cavity for complete distribution therein.

It is another object of the invention to provide protective means for the spray tube of the device, which means shall act as a removable cover member for the tube as well as a closure means for the forward open end of the tube. It is an object of the invention to provide such a cover member in the form of a plurality of movable elements operative as dilators to spread the walls of the body cavity when inserted therein and to insure entry and distribution of the injected preparation.

It is an object of the invention to provide closure means for a spray tube in the form of a pair of pivotal tubular elements which are manually spread apart when entered into a body cavity and which by their spreading action not only serve as dilators but also cause the opening of a valve of a supply container to thereupon result in the preparation contained therein to be ejected through the spray tube.

With these, and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a side elevational view of an irrigation or spray device constructed in accordance with the invention;

Fig. 2 is a top plan view of the same, but with the supply container removed;

Fig. 3 is a front elevational view of the same;

Fig. 4 is a side view, with a portion in section, of one of the parts or segments of the spray tube enclosure or cover member;

Fig. 5 is a longitudinal sectional view on an enlarged scale through the device;

Fig. 6 is a side elevational view, on a reduced scale, of the device showing the same with the parts in the act of spraying, and Fig. 7 is a longitudinal sectional view through a modified construction.

Referring to the drawing, and more particularly to the embodiment shown in Figs. 1 to 6 inclusive, 1 indicates generally the frame of the device. The same is in cup-shape and it includes a back wall 2, top wall 3, bottom wall 4 and side walls 5 and 54. Each of these walls is provided at its forward end with a flange 6, serving as a stop for limiting insertion of the device. Secured to and extending through the back wall 2 is a spray tube 7, provided with a forward open end 8 that is tapered or beveled substantially as shown in the drawing. The rear end of the spray tube is threaded as shown at 18, said threaded end receiving a washer 16 and a lock nut 17, and constituting a nipple for the threadable reception of the internally-threaded neck 34 of a spray bottle 33 or other container holding the preparation to be sprayed. The preparation contained in the container 33 may be a liquid, a finely-divided medicament in a gas, a cream or a foam under pressure, or may consist of any other material which will be ejected out of the forward open end 8 of the spray tube 7, upon pressure being imposed on a valve 32 with which the container 33 is provided.

The normal or closed position of the device is shown in Figs. 1, 2 and 3, wherein it will be noted that the spray tube 7 is enclosed for the greater portion of its length in a pair of enclosure members or covers shown respectively at 11 and 13. These enclosure members are each of semi-cylindrical form and when disposed in meeting position as shown in Figs. 1, 3 and 5, the same cooperate in the formation of a cylindrical body provided at the forward end with a smooth, rounded, dome-shape facilitating the entry of the enclosure member into a body opening such as the vagina, rectum etc. At its forward end, each of the closure members 11 and 13 is provided on its inner surface with an inclined seat 9 contacting with the bevelled end 8 of the spray tube 7 so that when the enclosure members 11 and 13 are in their closed position, as shown in Figs. 1 to 3 and 5, these surfaces 9 form seats against the forward open end of the spray tube 7 and close the said opening.

The enclosure members 11 and 13 are pivotally mounted in the frame 1, the enclosure member being pivoted on screws or pins 30 in the opposite walls 5 and 54 of the cup or frame 1, while the enclosure member 13 is similarly pivoted on screws or pins 31 in the same walls. From this construction, it will be apparent that the enclosure members 11 and 13 may, when desired, be pivotally moved to the open position shown in Fig. 6, in which position the forward ends of the enclosure members 11 and 13 are separated, or spread apart to an extent to cause them to uncover the forward open end 8 of the spray tube 7 and permit part of the contents of the container 33 to be ejected out of the spray tube upon opening of the valve 32. To permit of this pivotal movement of the enclosure members 11 and 13, the meeting edges of said members toward the rear, are inclined as indicated at 15.

Secured on the spray tube 7 substantially midway of its ends, is a sleeve 14, and attached to the sleeve by screws or rivets 20 are two leaf springs 19 which respectively exert pressure to normally maintain the two enclosure members 11 and 13 in the closed position of Figs. 1, 2 and 3. Fastened to the enclosure member 11 and extending laterally therefrom and passing through slot 10 in the wall 3, is a stem 21 provided at its end with a button or knob 25 constituting a finger-piece by which the rear end of the enclosure member 11 may be depressed and its forward end caused to rise as shown in Fig. 6. Held between the under side of the button or knob 25 and a nut 23 threaded on the stem 21, is a bent finger 24 having an extremity or tip 26a. The finger 24 constitutes a valve opening member, and when the button or knob 25 is depressed, the extremity 26a of the finger will contact with the head of valve 32 and depress it to cause ejaculation of part of the contents of the container 33 through the spray tube 7.

Attached to the enclosure member 13 is a stem 26 carrying a button or knob 27 and when this button or knob is depressed simultaneously with the manual depression of the button or knob 25, both of the enclosure members will be separated at the forward ends to uncover the forward open end 8 of the spray tube as shown in Fig. 6. As this occurs, the finger 24 will have its extremity 26 urged against the valve 32 to open the same and cause the ejaculation of some of the material out of the container 33 and out of tube 7. Upon release of finger pressure on the buttons 25 and 27, the springs 19 will restore the enclosure members 11 and 13 to closed position and the seats 9 on the inside of the forward ends of the enclosure members will seal the forward open end 8 of spray tube 7 so that any of the material remaining in the tube will be sealed therein and will not harden or be permitted to contact with air. The enclosure members 11 and 13 thus serve as protective covers for the spray tube as well as permit the ready insertion of the same into the body orifice without the tube 7 contacting with the lining of the orifice. In addition, when the enclosure members are spread to the open position shown in Fig. 6, the same act as dilators to widen or spread the body orifice, thus insuring the entry of the sprayed material and its contact or distribution with the internal surfaces of the orifice.

In the embodiment of the invention shown in Fig. 7, the enclosure member is a one-piece cylinder provided at its forward end with a spray opening 41 which is aligned with, but slightly spaced from, the forward opening end of the spray tube shown at 7a. A sliding valve 48 in the form of a thin curved plate fits between the forward open end of the spray tube and the opening 41 and thus normally interrupts communication between the same. The valve 48 is provided at the forward end of a lever 47, pivoted at 46 on the spray tube, and the lever has a rearward extension or arm 49, which is upwardly spring-urged. The finger-piece 45, carrying the valve-operating member 44, similar to that shown at 24, will when depressed, raise the forward end of the lever 47 to an extent as to move the valve 48 from between the end of the spray tube and the opening 41. When this is done, the valve 32 will be depressed by finger 44 and the material from container 33 will be ejected through the tube 7a, out of the forward open end of the same and through the opening 41. On release of pressure of the finger-piece 45, the valve 48 will close.

The device may be made of metal, or in whole or in part of plastic and may be kept clean and sanitary and will be found effective in any spraying, irrigating or injection into body orifices.

Having described two embodiments of the invention, it is obvious that the same is not to be restricted thereto, but is broad enough to cover all structures coming within the scope of the annexed claims.

What we claim is:

1. A spray device of the character described comprising, a spray tube open at its forward end, a container holding material to be ejected through the tube by gas pressure in the container, the container being connected to the rear end of the tube, tube-enclosure members normally enclosing the tube and closing the forward open end of the same, said enclosure members being relatively movable to spread their forward ends apart to dilate a body orifice in which the forward part of the device is inserted, the container having a valve for controlling the emission of its contents, and a valve-opening device operable by movement of one of the cover members to open the valve and cause an ejection of its contents through the tube when the cover members are spread apart.

2. A spray device of the character described comprising, a spray tube open at its forward end and having a container attached to its rear end, said container having a valve and holding material to be ejected under pressure through the spray tube, a pair of cooperating, pivotal, semi-cylindrical cover members fitted around the spray tube, said cover members forming a rounded, closed forward end over the open forward end of the spray tube, manual means by which the cover members may be pivotally moved to cause them to spread apart at their forward ends and to uncover the open forward end of the spray tube, and an element supported from one of the cover members for opening the valve when the cover members are spread apart.

3. A spray device of the character described comprising, a cup-shaped frame having side walls and a back wall, a spray tube secured at one end to the back wall and extending forwardly and out beyond the frame, the spray tube being open at its forward end and having a threaded rear end extending behind the back wall, a container removably attached to said threaded rear end, said container holding material for ejection through the spray tube, the container having a valve for permitting ejection of the material when the valve is opened, a cylindrical two-part enclosure for the spray tube, said enclosure presenting a closed forward end over the forward open end of the spray tube, the parts of the enclosure being pivotally mounted between walls of the frame, a finger-piece on each of the enclosure parts by means of which said parts are pivoted to cause them to spread apart at their forward ends and uncover the forward open end of the spray tube, and a valve-opening element carried by one of the finger-pieces for opening the valve when the forward ends of the enclosure parts uncover the forward open end of the spray tube.

4. A device of the character described comprising, a spray tube of tubular form, a frame surrounding a part of the tube, means at the rear end of the tube for receiving a chamber filled with a gas and material to be ejected through the tube, the chamber having a valve, a pair of semi-cylindrical dilators surrounding the tube and pivoted in the frame, spring means for holding the dilators together in position to enclose the forward part of the tube and to cover the oulet opening thereof, each dilator having a finger-piece, one of the finger-pieces being provided with a valve-operating element, whereby upon finger pressure being imposed on the finger-pieces the dilators will be hingedly moved apart to uncover the forward end of the nozzle, and the valve will be opened by the valve-operating element.

5. A device of the character described comprising, a spray tube, a chamber connected thereto, said chamber having a valve, a pair of pivoted dilators enclosing the spray tube, spring means for holding the dilators in closed position around the spray tube, a finger-piece on each of the dilators for pivotally moving them to position to uncover the forward end of the spray tube, one of the finger-pieces carrying a finger for depression of the valve when the dilators are moved to open position.

6. A spray device of the character described comprising, a cup-shaped frame, a spray tube secured at one end in said frame and extending forwardly and out beyond the frame, the spray tube having an open forward end and having a rear end situated at the rear end of the frame, a container removably attached at the rear end of the spray tube, said container having a valve for permitting ejection of its contents when the valve is opened, the valve being carried by the container and removable with the same when the container is detached from the rear of the spray tube, a two-part enclosure for that portion of the spray tube that extends beyond the frame, said enclosure consisting of a pair of spring-biased dilators pivoted in the frame and normally presenting a closed forward end over the forward open end of the spray tube, manually-operated means by which the dilators are pivotally spread apart at their forward ends to dilate the walls of the body opening in which they are inserted and to uncover the forward open end of the spray tube, and means borne by one of the dilators for opening the valve when the forward ends of the dilators uncover the forward end of the spray tube.

7. A spray device of the character described comprising, a frame, a spray tube mounted therein and having a front open end extending forwardly of the frame, a sleeve mounted on the spray tube within the frame and positioned intermediate of the ends of the spray tube, a pair of dilators pivoted in the frame and to the sleeve, said dilators being spring-biased by springs attached to the sleeve and having ends operative against the dilators, said springs being effective to maintain the forward ends of the dilators in contact with one another and in a position to cover the front open end of the spray tube, the frame having slots, finger-pieces on the dilators projecting through said slots and adapted when manually depressed to pivot the dilators in a manner to spread the forward ends of the dilators apart to uncover the front open end of the spray tube, and means at the rear end of the spray tube for coupling a container holding a material to be sprayed to said end of the spray tube, said container having a valve, and means operative by pivotal movement of the dilators for opening the valve.

8. A spray device of the character described, comprising a spray tube open at its forward end, the other end of the tube being adapted for attachment to a container holding material to be ejected through the tube and having a valve to control the emission of its contents, tube-enclosure members normally enclosing the tube and closing the forward open end of the same, said enclosure members being relatively movable to spread their forward ends apart to dilate a body orifice in which the forward part of the device is inserted, and a valve-opening device operable by movement of one of the cover members to open the valve on a container positioned at the end of the tube when the cover members are spread apart.

9. A spray device of the character described, comprising a cup-shaped frame having side walls and a back wall, a spray tube secured at one end of the back wall and extending forwardly and out beyond the frame, the spray tube being open at its forward end and having a threaded rear end extending behind the back wall, the rear end being adapted for attachment to a container holding material to be ejected through the tube and having a valve to control the emission of its contents, a cylindrical two part enclosure for the spray tube, said enclosure presenting a closed forward end over the forward open end of the spray tube, the parts of the enclosure being pivotally mounted between the walls of the frame, a finger piece on each of the enclosure parts by means of which said parts are pivoted to cause them to spread apart at their forward ends and uncover the forward open end of the spray tube and a valve opening element carried by one of the finger pieces for opening the valve on a container positioned at the end of the tube when the forward ends of the closure parts uncover the forward open end of the spray tube.

10. A spray device of the character described, comprising a cup-shaped frame having slotted side walls and a back wall, a spray tube secured at one end of the back wall and extending forwardly and out beyond the frame, the spray tube being open at its forward end and having a threaded rear end extending behind the back wall, the rear end being adapted for attachment to a container holding material to be ejected through the tube and having a valve to control the emission of its contents, a cylindrical two part enclosure for the spray tube, said enclosure presenting a closed forward end over the forward open end of the spray tube, the parts of the enclosure being pivotally mounted between the walls of the frame, a finger piece on each of the enclosure parts and passing through a slot in the side wall of the frame by means of which finger piece said parts are pivoted to cause them to spread apart at their forward ends and uncover the forward open end of the spray tube, and a valve opening element carried by one of the finger pieces for opening the valve on a container positioned at the end of the tube when the forward ends of the closure parts uncover the forward open end of the spray tube.

References Cited in the file of this patent

UNITED STATES PATENTS

| | | |
|---|---|---|
| 393,580 | Parsons | Nov. 17, 1888 |
| 605,682 | Seibert | June 14, 1898 |
| 1,732,337 | Miller | Oct. 22, 1929 |
| 1,854,726 | Ziegler | Apr. 19, 1932 |
| 1,943,110 | Corbett | Jan. 9, 1934 |
| 2,512,434 | Len | June 20, 1950 |

FOREIGN PATENTS

| | | |
|---|---|---|
| 624,117 | Germany | Jan. 13, 1936 |